United States Patent Office 3,592,883
Patented July 13, 1971

3,592,883
MARKING CARBONIZED PENCIL LEADS USING SULFONATED LIGNIN OR AN AQUEOUS SODIUM SALT OF LIGNIN AS A BINDER
Takamasa Kawakubo, Koza County, Kanagawa Prefecture, Japan, assignor to Mitsu-bishi Pencil Company Limited, Tokyo, Japan
No Drawing. Filed Feb. 12, 1969, Ser. No. 798,763
Claims priority, application Japan, Mar. 21, 1968, 43/17,978; June 11, 1968, 43/39,626
Int. Cl. C09d 13/00
U.S. Cl. 264—29   5 Claims

ABSTRACT OF THE DISCLOSURE

Pencil lead is made by mixing 40 to 50 parts of sulfonated lignin or an aqueous sodium salt lignin solution with 30 to 40 parts graphite and 5 to 10 parts of carbon black, kneading the mixture and heating to reduce the moisture content to below 20%. After extruding the mixture into the form of pencil lead and drying the formed articles they are heated to about 500° C. at a very slow rate of 5–10° C. per hour. Once 500° C. has been reached the articles are further heated to above 1000° C. at a faster rate of 30–50° C. per hour in a gaseous phase atmosphere that is inert to the articles, such as nitrogen. The very slow heating rate up to 500° C. is essential to good strength of the carbonized pencil lead. Supplementary binders and plasticizers such as polyvinyl alcohol, tragacanth gum, sodium alginate and carboxymethylcellulose can be added to prevent premature thermal decomposition of the lignin.

---

This invention relates to a process for making pencil leads.

A lead for a conventional graphite pencil is made by mixing a proper amount of carbon black as a coloring agent with graphite, kneading the mixture with water together with clay as a caking agent, extrusion-molding the mixture and then heating it at 1000 to 1200° C. so as to be sintered. However, such lead is lacking in strength.

This fact has been a very great disadvantage particularly to a very fine lead used for a sharp pencil or lead holder. Further, there is also a process wherein such synthetic resin as vinyl chloride or pitch or the like is used as a caking agent. However, the reaction at the sintering process results in variations such that the hardness will be different in the respective parts. Further, a special solvent is required, a remarkably long time is required for sintering and the complicated production technique requires skill. Such synthetic resin or pitch has so few functional radicals other than alkyl radicals or halogen radicals that the cross-linking reaction in the region of low temperature, in the initial period of sintering, will be insufficient and the molded leads will be fused with each other. Therefore, in order to prevent such fusing, a complicated operation, oxidizing the surface of molded leads in the air or ozone containing air heated about 150° C., is required. Thus the production of the lead is difficult.

An object of the present invention is to provide a process for obtaining fine leads having a breaking strength more than 50 to 100% higher than conventional pencil lead particularly useful for sharp pencils or holders.

Another object of the present invention is to provide a process for obtaining fine leads which are easy to make and good in the writing touch.

A further object of the present invention is to provide a process for obtaining fine leads cheaply by utilizing a by-product in the production of pulp.

According to the process of the present invention, lignin is dissolved in water or any other proper solvent to form a solution which is thereafter mixed and kneaded with graphite and carbon black; the solvent is evaporated so that the viscosity of the mixture will be suitable for the extrusion molding.

An extrusion molding is operated in 80–95° C.

A wet lead molded in desired diameter is cut, dried in air, heated and baked over 8 hours in an electric furnace up to the maximum temperature 1000–1200° C. in the reducing atmosphere of nitrogen gas.

After being cooled to room temperature, baked lead is dipped in the special oil and heated up to about 200° C. to saturate the micropores of lead with the oil. Thus the process is completed.

For the above described lignin, SP lignin obtained from a waste liquid in the production of pulp by a sulfide process or KP lignin obtained from a waste liquid in the production of kraft pulp are useful. The latter is particularly well suited. An example of its producing process shall be described. First of all, wood chips are treated at a high temperature with a digested solution consisting of sodium hydroxide and sodium sulfide so that about half the amount of the organic components including lignin in the wood may be washed out. In such case, wood fibers are taken out as kraft pulp. The waste liquid thus washed out is blacked viscous liquid containing a large amount of thiolignin and other organic components and inorganic substances. This black liquid is concentrated and as acid is added to it to reduce its pH so that thiolignin of sodium salt may be precipitated. Or a dilute acid is made to further act on the precipitate so that the precipitate may be refined to be of an acid type low in the ash content. It is treated at a high temperature with the addition of sodium sulfite so that a sulfone radical may be introduced into the thiolignin skeleton and is then dried. Such sulfonated lignin is a water-soluble brown powder. When it is dissolved into water and graphite and carbon black are mixed with it, due to the favorable surface active action of said lignin itself, the graphite and carbon black and the lignin itself as a caking agent will easily disperse in water to obtain a uniform mixture. Therefore, the kneading step can be carried out very easily at a high efficiency within a short time.

Further, in case the mixture is dehydrated and extrusion-molded, the slurry viscosity will reduce due to the action of the lignin. Therefore, as described above, it can be easily molded with a comparatively small amount of water. Thus, the drying after the molding is easy and the production efficiency can be increased. Further, lignin has a very large amount of such functional radicals high in the thermoreactivity as —$OCH_3$, —OH and —COH present in the molecule. Therefore, in the case of baking after the drying, cross-linking will be easily produced in low temperature region in the initial period. That is to say, even in the case it is heated in an inert gas phase, at a temperature below 300° C., the cross-linking reaction will proceed easily. Therefore, there is no fear of causing a fusing phenomenon between the adjacent leads and no need of such complicated oxidation operation. Further, as no great weight reduction is caused and the temperature can be elevated comparatively quickly, the operation of the baking step is also easy.

Examples of the present invention shall be explained in the following.

EXAMPLE 1

50 parts of sulfonated lignin are uniformly dissolved into a proper amount of water, then 30 parts of crystal graphite, 20 parts of earth graphite and about 5 parts of carbon black as a coloring agent are put into the solution and the mixture is agitated. It is kneaded with rolls and is at the same time heated to gradually evaporate water. When the water content becomes 15 to 20%, the mixture is put into a lead extruding molder to obtain a lead of any desired diameter. It is then cut into any desired length and has the water content substantially perfectly removed with a hot air dryer. The thus well dried lead is put into a furnace and is heated and baked up to 1000 to 1200° C. for about 8 hours in a reducing atmosphere. After cooling, the lead is taken out and dipped in the oil to saturate the micropores of lead saturate with the oil. A completed pencil lead may be obtained.

EXAMPLE 2

40 parts of sodium salt type lignin or sulfonated lignin mentioned in Example 1 are dissolved in water or a mixed solvent of acetone and alcohol, 30 parts of crystal graphite, 20 parts of earth graphite and about 5 parts of carbon black as a coloring agent are put into the solution and further 10 parts of such natural paste as tragacanth gum are mixed into it and a pencil lead is made by the same process as in Example 1. In such case, the natural paste is to make the molding of the lead easy.

The graphite pencil lead made by such producing process as is described above is so good in the writing touch as to be smooth in writing and has a very high breaking strength. For example, the pencil lead of the same hardness as of a conventional lead having a transverse strength of 8000 to 11,000 g./mm.² can give a strength of 12,000 to 20,000 g./mm.².

According to the present invention, when the temperature elevating velocity for baking the lead is reduced to 5 to 10° C. per hour so that the lead may be heated very gradually (and also a proper paste is mixed into the caking agent lignin) the quick thermal decomposition of the lignin in region of a low temperature can be prevented, the residual carbon can be increased and the breaking strength can be more remarkably increased.

In the present process, after such natural or synthetic paste as, for example, tragacanth gum or polyvinyl alcohol is added to the lignin, graphite and carbon black admixture, the mixture is agitated, kneaded, so that the water content may be reduced to about 10 to 20% and then formed into a lead of any desired diameter with an extruding molder or the like. This lead is dried in air, put into the electric furnace and heated first very gradually up to 500° C. at a temperature elevating velocity of 5 to 10° C. per hour. That is to say, 500° C. is reached by taking more than 60 to 100 hours. Then the temperature elevating velocity is increased to about 30 to 50° C. per hour to heat and bake the lead up to 1000 to 1200° C. The lead coming through such baking step is dipped in an oil bath to be impregnated with oil so that a completed lead may be obtained.

When the aforementioned paste is added to the lignin solution, the molding will become easy, the raw lead before being baked will be hard to break and the yield will increase. It is therefore very effective. Further, such paste addition prevents premature decomposition of the lignin occurring in a low temperature region by uniformly reacting of such with functional groups of lignin, also the amount of residual carbon is increased by the recondensation of low molecular weight decomposition products and therefore acts on growth of the bonded carbon structure contributing to effective sintering. The paste employed is a substance of a long chain molecular such as cellulose or a substance having many hydrogen bonds and desirably the paste is water-soluble. Such natural, synthetic or semisynthetic paste as for example, tragacanth gum, sodium alginate, poly-sodium acrylate, carboxymethylcellulose or polyvinyl alcohol are so reactive with lignin and so unlikely to decompose as to be able to be effectively utilized in the process of the present invention.

Further, in the case of mixing graphite and carbon black with a lignin solution (to which such proper paste mentioned above has been added, molding the mixture and drying and baking it) when the temperature is very gradually elevated at a velocity of 5 to 7° C. per hour in the range from the room temperature to about 500° C., the quick reaction in a low temperature region is prevented, the rate of residual carbon is increased and the bonded carbon structure contributing to the sintering is sufficiently grown, the breaking strength can be remarkably increased. That is to say, as the reactivity in the low temperature region by the functional radicals of the lignin and paste is well elevated and a long time is taken, the uniformity will improve, the residual carbonaceous substances forming the structure will increase, therefore the sinterability will improve and the strength of the lead will increase. For example, in case the temperature is elevated at a velocity of 50° C. per hour from the room temperature to 500° C., fine cracks will be produced and it will be difficult to obtain a breaking strength above about 12,000 to 20,000 g./mm.². On the other hand, if the temperature is gradually elevated at a reduced velocity of 10° C. per hour in the range up to 500° C. as described above, such cracks will be prevented and a breaking strength of 20,000 to 28,000 g./mm.² can be obtained. If this temperature elevating velocity is further reduced to 5° C. per hour, the breaking strength will become 23,000 to 30,000 g./mm.² and the lower limit will increase. That is to say, when the temperature elevating velocity is reduced to be below 10° C. per hour, the breaking strength will remarkably increase and, when it is reduced to be lower, the lower limit of the breaking strength will gradually increase. Therefore, in the present invention, the temperature elevating velocity is made less than 10° C. or particularly 5 to 7° C. per hour from the room temperature up to about 500° C. and is made comparatively higher to be about 30 to 50° C. per hour from 500° C. up to 1,000 to 1,200° C. in baking.

An example of the above mentioned process is shown in the following.

EXAMPLE 3

A material solution of a composition of 40 parts by weight of lignin sulfonate, 10 parts by weight of polyvinyl alcohol, 10 parts by weight of ethylene glycol and 100 parts by weight or water is prepared, 40 parts by weight of graphite and 10 parts by weight of carbon black are mixed with it and the mixture is well agitated, is properly evaporated and is well kneaded with mixing rolls. At the same time, the mixture is heated to evaporate water contained in it. When the water content becomes 10 to 15%, a lead of any desired size is formed of the mixture with an extruding molder. The lead is wound up, cut into a proper length, dried and then put into a furnace and baked up to 500° C. elevating the temperature 5° C. per hour. Then the lead is heated up to 1,100° C. at an increased temperature elevating velocity of 30° C. per hour and cooled naturally. The lead is taken out of the furnace, and dipped in an oil bath to be impregnated with oil and to be completed. The thus obtained pencil lead has a breaking strength of 23,000 to 28,000 g./mm.² as described above and is good in the writing touch.

What is claimed is:

1. A process for making pencil leads comprising the steps of dissolving from about 40 to 50 parts sulfonated lignin or lignin in sodium salt form in water, adding from about 30 to 40 prtas graphite of the type normally used for producing pencil leads and from about 5 to 10 parts carbon black to said solution, kneading said mixture with a mixer while heating to reduce the water content to below about 20%, molding the mixture with an extruding molder, drying the resultant molded article to remove the water content, thereafter baking said article by gradually raising the temperature at a heating rate of from about 5–10° C. per hour to a temperature of about 500° C. and thereafter increasing the heating rate to about 30–50° C. per hour to a temperature of at least about 1,000 C. in a gas phase inert to said article, thereby producing a pencil lead of good hardness and strength.

2. The process of claim 1 wherein the heating rate to about 500° C. is about 7° C. per hour and the heating rate between 500° C. and at least about 1,000° C. is about 50° C. per hour.

3. The process of claim 2 wherein 50 parts sulfonated lignin is employed with 50 parts graphite.

4. The process of claim 3 wherein a substance taken from the group consisting of tragacanth gum, sodium alignate, polysodium acrylate, carboxymethylcellulose, or polyvinyl alcohol is added to the solution of sulphonated lignin.

5. The process of claim 3 wherein the baking is carried out in an atmosphere of nitrogen.

References Cited
UNITED STATES PATENTS

| | | | |
|---|---|---|---|
| 2,280,988 | 4/1942 | Weiser | 106—19 |
| 2,348,315 | 5/1944 | Vaughan | 106—19 |
| 2,355,639 | 8/1944 | Ferst et al. | 106—19 |
| 2,645,582 | 7/1953 | Loy | 106—19 |
| 2,917,777 | 12/1959 | Pischel | 106—19 |
| 3,077,439 | 2/1963 | Shea, Jr. et al. | 264—29 |
| 3,446,878 | 5/1969 | Tsukahara | 264—29 |
| 3,461,082 | 8/1969 | Otani et al. | 264—29 |

DONALD J. ARNOLD, Primary Examiner

J. H. MILLER, Assistant Examiner

U.S. Cl. X.R.
106—19, 26, 123